United States Patent [19]
Hirahara et al.

[11] Patent Number: 6,094,338
[45] Date of Patent: Jul. 25, 2000

[54] ELECTRIC DOUBLE-LAYER CAPACITOR

[75] Inventors: Satoshi Hirahara; Kohei Okuyama; Mitsuo Suzuki; Kazushi Matsuura, all of Yokohama, Japan

[73] Assignee: Mitsubishi Chemical Corporation, Tokyo, Japan

[21] Appl. No.: 09/111,765

[22] Filed: Jul. 8, 1998

[30]    Foreign Application Priority Data

| Jul. 9, 1997 | [JP] | Japan | 9-183670 |
| Oct. 15, 1997 | [JP] | Japan | 9-281515 |
| Oct. 15, 1997 | [JP] | Japan | 9-281516 |
| Nov. 4, 1997 | [JP] | Japan | 9-301913 |
| Nov. 11, 1997 | [JP] | Japan | 9-308207 |
| Apr. 16, 1998 | [JP] | Japan | 10-106046 |

[51] Int. Cl.[7] ................................. H01G 9/00
[52] U.S. Cl. .................... 361/502; 361/503; 361/508; 29/25.03
[58] Field of Search ..................... 361/502, 503, 361/504, 505, 506, 508, 512, 500; 29/25.03

[56]    References Cited

U.S. PATENT DOCUMENTS 4,363,079  12/1982  Sekido .
5,455,999  10/1995  Weiss et al. ........................ 29/623.1
5,827,602  11/1998  Koch et al. .......................... 429/194

OTHER PUBLICATIONS

The Electrochemical Society, What's New on the ECS Home Page?, *Boston, Massachusetts Meeting Program* (Nov. 1–6, 1998) (7 pages).

Nakamura et al J. of Power Sources, vol. 60, 1996, pp 225–231 Influence of physical Properties of activated carbons on characteristics of electric double–layer capacitors.

*Primary Examiner*—Kristine Kincaid
*Assistant Examiner*—Eric Thomas
*Attorney, Agent, or Firm*—Nixon & Vanderhye

[57]    ABSTRACT

Electric double-layer capacitor are disclosed having a nonaqueous solvent electrolyte; and a pair of polarized electrodes as positive and negative electrodes. These polarized electrodes have a rest potential nearly central between a substantial decomposition initiation voltage of the electrolyte on an oxidation or high-potential side and a substantial decomposition initiation voltage of the electrolyte on a reduction or low-potential side.

4 Claims, 3 Drawing Sheets

ELECTRIC DOUBLE-LAYER CAPACITOR

BACKGROUND OF THE INVENTION

The present invention relates to an electric double-layer capacitor, and more particularly to an electric double-layer capacitor which is excellent in charge-discharge cycle life and durability upon application of a high voltage, and has a large energy density.

Electric double-layer capacitors capable of high-current charging or discharging, are expected to apply uses such as electric vehicles, auxiliary powers or the like. Consequently, there has been a demand for realizing electric double-layer capacitors which can be rapidly charged and discharged, and are excellent in durability upon application of a high voltage and charge-discharge cycle life.

The energy accumulated in a cell of the capacitor is calculated according to the formula of $1/2 \cdot C \cdot V^2$, wherein C represents a capacitance (F) per cell and V represents a voltage (V) applicable to the cell. Since the energy accumulated in the capacitor is proportional to a square of the applicable voltage V, it is effective to apply a high voltage to the capacitor in order to increase an energy density of the capacitor. However, in the case where the voltage applied is too large, there arise disadvantages such as decomposition of an electrolyte used therein.

Therefore, in the case of conventional electric double-layer capacitors using a non-aqueous electrolyte, the withstand voltage per cell is limited to about 2.4 V though the value of the voltage is varied depending upon kinds of solute and solvent used in the electrolyte. When a voltage as high as not less than 2.5 V is applied to these conventional capacitors, there are caused disadvantages such as rapid increase of internal series resistance, rapid decrease of capacitance upon use or the like.

Under these circumstances, an activated carbon as a main materials of positive and negative electrode sides of the capacitor, a separator, an electrolyte, a container and the like, have been studied in detail and on the basis of these studies, it has been attempted to apply a voltage of 2.5 V to 2.8 V to the capacitor. For example, in order to improve a durability of the capacitor, there have been proposed a method of subjecting an electrode composed of activated carbon which is obtained by activating a phenol resin, a petroleum coke or the like with KOH, to heat treatment in an inert atmosphere; a method of using sintered products of a phenol resin, a furan resin, a polyacrylonitrile resin or the like as a raw material therefor (Japanese Patent Application (KOKAI) No. 8-162375(1996)); a method of using porous aluminum as a current collector of the capacitor (Japanese Patent Application (KOKAI) No. 8-339941(1996)); or the like.

However, these conventional methods have problems and are more or less unsatisfactory. For example, in the above-mentioned method of heat-treating an electrode composed of activated carbon obtained by activating phenol resin, petroleum coke or the like with KOH, in an inert atmosphere, there arises such a problem that an initial capacitance of the obtained capacitor becomes lowered. Further, in the methods described in Japanese Patent Applications Laid-open (KOKAI) Nos. 8-162376(1996) and 8-339941(1996), the durability of the capacitors cannot be essentially improved. For these reasons, it has been substantially impossible to apply a voltage of not less than 3 V to a cell of the conventional capacitors. This inhibits the production of capacitors having a high energy density.

In order to enable the voltage of not less than 3 V to be applied to a cell of capacitors, in Japanese Patent Application Laid-open (KOKAI) No. 8-107048(1996), there has been proposed a capacitor using a negative electrode composed of a lithium-doped graphite obtained by contacting graphite and lithium foil, a positive electrode composed of activated carbon and an electrolyte containing lithium ions as a solute.

However, the negative electrode of the capacitor is a non-polarized electrode so that an oxidation-reduction reaction tends to be caused between the negative electrode and the electrolyte. Consequently, there arises a problem that the capacitor has a low durability. In addition, since the negative electrode of the capacitor contains lithium, the positive electrode (polarized electrode) of the capacitor already has a voltage of about 3 V even in uncharged condition. As described in Examples of the Japanese Patent Application Laid-open (KOKAI) No. 8-107048(1996), in the case where the capacitor is charged up to 4.3 V, the change in potential from that in the uncharged state is about 1.3 V. Therefore, when such an element is used as a capacitor, the energy density thereof is lower than that of ordinary capacitors.

For these reasons, it has been demanded to provide a high energy density electric double-layer capacitor not only having a positive electrode charging potential lower than the decomposition voltage of an electrolyte used, but also exhibiting a large potential difference between charging and discharging, e.g., not less than 3 V.

As a result of the present inventors' earnest studies for solving the above-mentioned problems, it has been found that by optionally controlling a rest potential of electrodes by a method which is essentially different from conventionally proposed methods such as a method of preventing the decomposition of electrolyte or a method of reducing the amount of impurities contained in electrodes, it can become possible to apply to a capacitor a wide range of voltage which nearly reaches the decomposition voltage of electrolyte due to oxidation or reduction thereof, thereby enabling an energy density of the capacitor to be increased notwithstanding the capacitance thereof remains uncharged. The present invention has been attained on the basis of this finding.

SUMMARY OF THE INVENTION

An object of the present invention is to provide a high energy density electric double-layer capacitor capable of exhibiting an extremely large charging and discharging voltage as compared to those of conventional capacitors.

Another object of the present invention is to provide an electric double-layer capacitor which is excellent in charge-discharge cycle life and durability upon application of a high voltage.

To attain the above aim, in a first aspect of the present invention, there is provided an electric double-layer capacitor comprising:

a non-aqueous solvent electrolyte; and polarized electrodes as positive and negative electrodes, which polarized electrodes have a rest potential being nearly central between a substantial decomposition initiation voltage of the said electrolyte on an oxidation or high-potential side and a substantial decomposition initiation voltage of the said electrolyte on a reduction or low-potential side.

In a second aspect of the present invention, there is provided an electric double-layer capacitor comprising a non-aqueous solvent electrolyte and polarized electrodes as positive and negative electrodes, which polarized electrodes have a rest potential satisfying the condition represented by the following formula:

$$(A+B)/2 - 1.0 \leq E \leq (A+B)/2 + 0.2$$

wherein E (V) represents a rest potential of said polarized electrodes; A (V) represents a substantial decomposition initiation voltage of the said electrolyte on an oxidation or high-potential side; and B (V) represents a substantial decomposition initiation voltage of the said electrolyte on a reduction or low-potential side.

In a third aspect of the present invention, there is provided an electric double-layer capacitor comprising:

a non-aqueous solvent electrolyte; and polarized electrodes as positive and negative electrodes, wherein at least one material selected from the group consisting of metals and inorganic substances is added thereto, and which polarized electrodes have a rest potential after adding the material, satisfying the conditions represented by the following formulae:

in the case of E1>(A+B)/2, A+B−E1<E2<E1      (1)

in the case of E1<(A+B)/2, A+B−E1>E2>E1      (2)

wherein E1 (V) represents a rest potential of said polarized electrodes before adding said material thereto; E2 (V) represents a rest potential of said polarized electrodes after adding the said material thereto; A (V) represents a substantial decomposition initiation voltage of said electrolyte on an oxidation or high-potential side; and B (V) represents a substantial decomposition initiation voltage of the said electrolyte on a reduction or low-potential side.

In a fourth aspect of the present invention, there is provided an electric double-layer capacitor comprising an aqueous solvent electrolyte and activated carbon electrodes as positive and negative electrodes, said activated carbon electrodes containing lithium in an amount of 0.01 to 2% by weight.

DETAILED DESCRIPTION OF THE INVENTION

Figure 1:
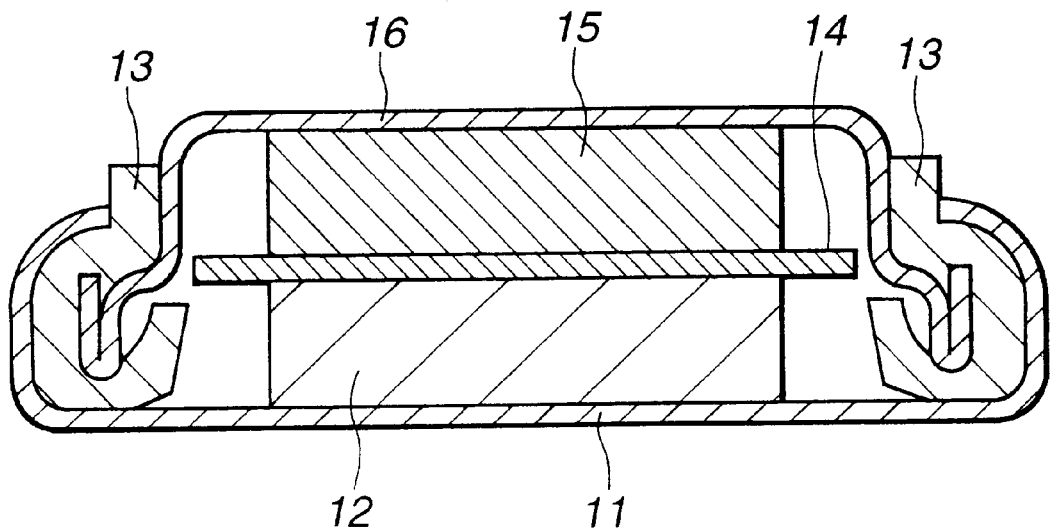
FIG. 1 is an explanatory cross-sectional view of a coin cell used in Example 1 for doping an electrode with lithium.

The present invention is described in detail below.

The most important feature of the present invention lies in that in an electric double-layer capacitor comprising a non-aqueous solvent electrolyte and polarized electrodes as positive and negative electrodes, a rest potential of the polarized electrodes which potential is generated upon immersing these electrodes in the non-aqueous solvent electrolyte, is appropriately controlled, so that it becomes possible to increase a charging and discharging voltage thereof to such an extent as to be never reached by conventional capacitors, thereby providing a high energy density electric double-layer capacitor. In addition, in the electric double-layer capacitor according to the present invention, since the potential upon charging and discharging does not exceed a decomposition voltage of the electrolyte, the capacitor can be largely improved in charge-discharge cycle life and durability upon applying a high voltage thereto.

First, the principle of the present invention will be explained below.

According to the present inventors' studies, disadvantages of the conventional electric double-layer capacitors such as deteriorated durability or limited charging voltage as low as 2.8 V, are considered to be caused by a relationship between change in potential of positive and negative electrodes of the capacitor and the decomposition voltage of electrolyte used therein.

Although the decomposition voltage of the electrolyte is varied depending upon kinds of solvent, solute or the like of the electrolyte, in the case where, for example, a solution of quaternary alkyl ammonium salt in propylene carbonate as a typical one which is hard to decompose, is used and in the case where electrodes used are substantially formed of a carbonaceous substance, the substantial decomposition initiation voltage on an oxidation side has been reported to be about 4.4 V (relative to $Li/Li^+$). On the other hand, since a rest potential of a carbonaceous electrode is ordinarily about 3 V (relative to $Li/Li^+$), when the potential difference between the positive and negative electrodes is not less than 2.8 V due to the polarization after charging, the potential on an oxidation side exceeds 4.4 V (relative to $Li/Li^+$), so that the electrolyte is considered to suffer from electrochemical decomposition. For this reason, in the case where conventional carbonaceous electrodes are used, there arises such a problem that gas or the like generated due to the decomposition of the electrolyte causes a capacitance of the capacitor to be decreased, resulting in deteriorated durability during long-term use. That is, theoretically, the maximum voltage applied to conventional electric double-layer capacitors is limited to about 2.8 V. Since it is impossible to apply a voltage of larger than 2.8 V to the conventional capacitors, there has been a severe limitation to increasing an energy density of the conventional capacitors.

The present inventors have now been found that by using polarized electrodes having such a rest potential capable-of raising the charging potential on a high-potential side (oxidation side) to as high a value as substantially equal to the decomposition initiation voltage of the electrolyte, it becomes possible to increase the potential difference upon charging and discharging, thereby realizing an electric double-layer capacitor which is not only excellent in durability but also enables a large voltage to be applied thereto, and further has a considerably high energy density.

Theoretically, by using polarized electrodes having such a rest potential whose value is nearly central between a substantial decomposition initiation voltage of the non-aqueous solvent electrolyte on a oxidation or high-potential side and that on a reduction or low-potential side, it becomes possible to obtain a maximum potential difference upon charging and discharging among those obtained by using the same electrolyte. In addition, it is considered that the use of such polarized electrodes enables the production of electric double-layer capacitors having a high durability.

However, actually, much severer problems which adversely affect the performance and durability of the electric double-layer capacitor, e.g., generation of gases due to decomposition of the electrolyte or the like, tend to be caused when the charging potential exceeds the decomposition initiation voltage of electrolyte on a high-potential side (oxidation side) rather than when the potential is decreased below the decomposition initiation voltage on a low-potential side (reduction side). For this reason, it is preferred that the charging potential of the capacitor be not more than the central value between the substantial decomposition initiation voltage of the non-aqueous solvent electrolyte on an oxidation or high-potential side and that on a reduction or low-potential side. More specifically, it is preferred that the rest potential of the polarized electrodes of the capacitor satisfies the condition represented by the following formula:

$$(A+B)/2-1.0 \leq E \leq (A+B)/2+0.2$$

wherein E (V) represents a rest potential of the polarized electrodes; A (V) represents the substantial decomposition initiation voltage of the electrolyte on an oxidation or high-potential side; and B (V) represents the substantial decomposition initiation voltage of the electrolyte on a reduction or low-potential side.

As the polarized electrodes, there may be used any electrodes as long as the rest potential thereof can satisfy the condition represented by the above-mentioned formula. There may be usually used electrodes made of at least one material selected from the group consisting of carbonaceous substances and inorganic substances. Further, in the case where the rest potential of the material used for the polarized electrodes is out of the above-mentioned range, at least one material selected from the group consisting of metals or inorganic substances may be added to the polarized electrodes to control the rest potential thereof.

From the viewpoint of controlling the rest potential of the polarized electrodes by adding such a material thereto, a further feature of the present invention lies in that in an electric double-layer capacitor comprising a non-aqueous solvent electrolyte and polarized electrodes as positive and negative electrodes, there are used as the polarized electrodes, such electrodes to which at least one material selected from the group consisting of metals and inorganic substances is added, and which satisfies the conditions represented by the following formulae:

in the case of E1>(A+B)/2, A+B−E1<E2<E1;   (1)

in the case of E1<(A+B)/2, A+B−E1>E2>E1   (2)

wherein E1 (V) represents the rest potential of the polarized electrodes before adding the material thereto; E2 (V) represents the rest potential of the polarized electrodes after adding the material thereto; A (V) represents a substantial decomposition initiation voltage of the electrolyte on an oxidation or high-potential side; and B (V) represents a substantial decomposition initiation voltage of the electrolyte on an reduction or low-potential side.

The substantial decomposition initiation voltage of the electrolyte is measured by usually electrochemical methods. In the present invention, it is considered that the decomposition of electrolyte initiates at the case where the oxidation-reduction current exceeds very low region, for example, not more than 0.1 mA/cm$^2$ measured by cyclic voltammetry, and the voltage in this stage is defined as the substantial decomposition initiation voltage of the electrolyte. The substantial decomposition initiation voltage of the electrolyte is varied by the measurement condition such as the temperature. In case of a typical non-aqueous electrolyte described hereinafter, the substantial decomposition initiation voltage of the electrolyte at the temperature of room temperature to 70° C. is about 4.2 to 4.5 volts (relative to Li/Li$^+$) on the oxidation side and 0.1 to 0.2 volt (relative to Li/Li$^+$) on the reduction side.

The rest potential of the polarized electrodes according to the present invention may be measured by ordinary electrochemical methods. Unlike potential measurement in an aqueous solution using a standard hydrogen electrode, a potential reference electrode for potential measurement in a non-aqueous system has not been strictly defined. However, actually, there have been widely used silver-silver chloride electrode, platinum electrode, lithium electrode or the like for the potential measurement in non-aqueous system. In the present invention, the potential can also be measured by similar methods. For example, in the case where a solution of quaternary alkyl ammonium salt in propylene carbonate is used as an electrolyte, the rest potential of the polarized electrodes is preferably not less than 1.5 V and less than 2.8 V (relative to Li/Li$^+$), more preferably not less than 1.7 V and less than 2.7 V (relative to Li/Li$^+$). In the case of such an electric double-layer capacitor using a solution of a quaternary alkyl ammonium salt in propylene carbonate as an electrolyte and carbonaceous electrodes as polarized electrodes whose rest potential is adjusted to about 2.3 V, even when a voltages as high as about 4 V is applied to the capacitor, the charging potential of the capacitor can be limited to a value not more than the decomposition initiation voltage of the electrolyte on an oxidation side. Therefore, since there is caused no decomposition of the electrolyte even upon applying a high voltage to the capacitor, the charge-discharge cycle life and the durability upon application of a high voltage can be considerably improved. Further, since a voltage applicable is increased from conventional 2.8 V to about 4 V, the electric double-layer capacitor according to the present invention can have an increased maximum energy density 2 to 6 times those of the conventional ones. Accordingly, the electric double-layer capacitor according to the present invention is remarkably useful as high power electric sources for electric vehicles or the like which are required to have a high energy density and a high durability.

It is preferred that the polarized electrodes before adding the above-mentioned material selected from the group consisting of metals and inorganic substances thereto, be substantially formed of at least one material selected from the group consisting of carbonaceous substances and inorganic substances.

As the inorganic substances, there may used semiconductor oxides or conductive oxides made of at least one metal oxide or composite oxide selected from the group consisting of ruthenium oxide, platinum oxide, osmium oxide, iridium oxide, tin oxide, manganese oxide, titanium oxide, vanadium oxide, chromium oxide, strontium oxide, tungsten oxide, cobalt oxide, nickel oxide, zinc oxide, cadmium oxide, copper oxide, iron oxide, niobium oxide, molybdenum oxide, rhenium oxide, rhodium oxide, lithium oxide, oxides of rare earth elements, ruthenium composite oxides, platinum composite oxides, osmium composite oxides, iridium composite oxides, tin composite oxides, manganese composite oxides, titanium composite oxides, vanadium composite oxides, chromium composite oxides, strontium composite oxides, tungsten composite oxides, cobalt composite oxides, nickel composite oxides, zinc composite oxides, cadmium composite oxides, copper composite oxides, iron composite oxides, niobium composite oxides, molybdenum composite oxides, rhenium composite oxides, rhodium composite oxides, lithium composite oxides and composite oxides of rare earth elements.

Especially, the use of activated carbons having a large number of solid-liquid interfaces is preferred because these activated carbons are relatively stable in electrochemical and chemical properties.

The materials to be added to the polarized electrodes are ones in which the rest potential of the polarized electrodes can be improved by the addition thereof. As the materials added, there may be used at least one material selected from the group consisting of metals and inorganic substances. As the inorganic substances added, there may used semiconductor oxides or conductive oxides made of at least one metal oxide or composite oxide selected from the group consisting of ruthenium oxide, platinum oxide, osmium oxide, iridium oxide, tin oxide, manganese oxide, titanium oxide, vanadium oxide, chromium oxide, strontium oxide, tungsten oxide, cobalt oxide, nickel oxide, zinc oxide, cadmium oxide, copper oxide, iron oxide, niobium oxide, molybdenum oxide, rhenium oxide, rhodium oxide, lithium oxide, oxides of rare earth elements, ruthenium composite oxides, platinum composite oxides, osmium composite oxides, iridium composite oxides, tin composite oxides, manganese composite oxides, titanium composite oxides, vanadium composite oxides, chromium composite oxides, strontium composite oxides, tungsten composite oxides, cobalt composite oxides, nickel composite oxides, zinc composite oxides, cadmium composite oxides, copper composite oxides, iron composite oxides, niobium composite oxides, molybdenum composite oxides, rhenium composite oxides, rhodium-composite oxides, lithium composite oxides and composite oxides of rare earth elements. Among them, metals may be preferably used because of simplicity in handling and effectiveness. The metals or the inorganic substances may be used in either an ionic state or a non-ionic state as long as the rest potential of the polarized electrodes can be suitably improved by the addition thereof.

In the case where it is intended to decrease the rest potential of the polarized electrodes, there may be used metals exhibiting a low potential (low-potential or base-potential metals). On the other hand, in the case where it is intended to increase the rest potential of the polarized electrodes, there may be used metals exhibiting a high potential (high-potential or noble-potential metals). For example, in the case of the existing electrolytes, it is effective to decrease the rest potential of the polarized electrodes. In this case, as the materials doped into the polarized electrodes, there may be exemplified alkali metals such as lithium, sodium, potassium, rubidium or cesium; alkali earth metals such as calcium or magnesium; rare earth metals such as yttrium or neodymium; or materials containing these metals. Among them, materials containing alkali metals are preferred, and materials containing lithium exhibiting an extremely low or base potential are more preferred.

In the case where the polarized electrodes are formed substantially of carbonaceous substances, low-potential or base-potential metals which tend to be occluded into carbon, such as lithium or potassium, may be preferably used to decrease the rest potential thereof. These metals may be doped into the polarized electrodes by electrochemical, chemical or physical methods though not limited thereto. For example, as a simple one of these methods, there may be used a method of short-circuiting an electrochemical cell constituted by a lithium-containing electrode formed of metal lithium exhibiting an extremely low or base potential or lithium-containing material as a positive electrode, a carbon electrode as a negative electrode, a separator and a non-aqueous electrolyte, to allow lithium to be doped into the carbon electrode.

As the preferred lithium-containing materials, for example, there may be used at least one material selected from the group consisting of lithium-containing alloys such as lithium-aluminum alloy or lithium-magnesium alloy, lithium-metal compounds, lithium-containing composite oxides such as lithium/manganese composite oxide, lithium/cobalt composite oxide, lithium/nickel composite oxide or lithium/vanadium composite oxide, lithium-containing chalcogenites such as lithium-containing titanium sulfide, lithium-containing niobium selenide, lithium-containing molybdenum sulfide, and lithium-containing carbon.

By limiting the lithium content of the electrode to usually 0.01 to 2% by weight, preferably 0.05 to 2% by weight based on the weight of the electrode, the potential of the activated carbon electrode after charging can be controlled to 3.8 to 4.2 V (relative to $Li/Li^+$) on a positive electrode side (oxidation side), and 0.2 to 0.8 V (relative to $Li/Li^+$) on a negative electrode side (reduction side) so that the decomposition of the non-aqueous electrolyte is unlikely to occur, though the potential value is varied depending upon bulk density, specific surface area, surface properties or the like of activated carbon used. Especially, in the case where the electrodes are made of activated carbon having a specific surface area of about 300 to about 2,300 $m^2/g$, which range is preferable for electrodes of capacitors, the lithium content of the activated carbon electrodes is usually 0.01 to 2% by weight, preferably 0.05 to 1.50% by weight based on the weight of the activated carbon electrode. When the lithium content is more than 2% by weight, metal lithium or a lithium compound tends to be separated upon charging and discharging of the capacitor and deposited on the surfaces of the electrodes, thereby causing the decrease in capacitance of the capacitor.

When the lithium content of both the activated carbon electrodes as positive and negative electrodes is adjusted to 0.02 to 2% by weight based on the weight of the activated carbon electrode to decrease the rest potential thereof and the maximum permissible voltage is applied to such activated carbon electrodes, the potential of the positive electrode in the electrolyte is in the range of 3.5 to 4.2 V (relative to $Li/Li^+$) and the potential of the negative electrode in the electrolyte is in the range of 0.2 to 0.8 V (relative to $Li/Li^+$), so that the capacitor can be prevented from being destroyed even when a voltage as high as not less than 3.35 V is applied thereto, thereby considerably enhancing the energy density of the capacitor.

Also, it is considered that the rest potential of the activated carbon electrodes is controlled by introducing heteroatoms such as boron, nitrogen or oxygen into carbon skeleton thereof or by introducing surface-functional groups such as an amino group, a carboxyl group, a phenol group, carbonyl group or a sulfone group into carbon. However, the rest potential of the electrodes may be more effectively controlled by adding or doping the above-mentioned metals thereinto.

As the materials for the carbonaceous electrodes before doping the metals thereinto, activated carbons having a large specific surface area are preferably used to obtain a large-capacitance electric double-layer capacitor. However, when the specific surface area of activated carbon used is too large, the bulk density of the electrodes is decreased, resulting in low energy density thereof. Therefore, the specific surface area of the activated carbon used for the electrodes is preferably 200 to 3,000 $m^2/g$, more preferably 300 to 2,300 $m^2/g$. As raw materials for the activated carbons, there may be used various materials, e.g., plant-based materials such as wood, sawdust, coconut shells or pulp mill waste liquor; fossil fuel-based materials such as coal, petroleum heavy oils; coal pitch or petroleum pitch obtained by thermal decomposition thereof; fibers obtained by spinning tar pitch; synthetic polymers; phenol resins; furan resins; polyvinyl chloride resins; polyvinylidene chloride resins; polyimide resins; polyamide resins; liquid crystal polymers; waste plastics; waste tires; or the like. These raw materials are carbonized and then activated. The activation methods may be generally classified into a gas-activation method and a chemical-activation method. The gas-activation method is called "physical activation" while the chemical-activation method is called "chemical activation". In the gas-activation method, the carbonized raw materials are contacted and reacted with steam, carbon dioxide gas, oxygen or other oxidative gases at a high temperature to produce activated carbon. In the chemical-activation method, the carbonized raw materials are uniformly immersed in an activating chemical and then heated in an inert gas atmosphere to conduct dehydration and oxidation reaction of the chemical, thereby producing activated carbon. As the chemicals used for the activation, there may be exemplified zinc chloride, phosphoric acid, sodium phosphate, calcium chloride, potassium sulfide, potassium hydroxide, sodium hydroxide, potassium carbonate, sodium carbonate, sodium sulfate, potassium sulfate, calcium carbonate or the like. Although various methods of producing activated carbon are described above, any other methods may also be used for the production of activated carbon. The activated carbon having various shapes may be used in the present invention, e.g., may be in the form of crushed particles, granulated particles, granules, fibers, felts, fabrics, sheets or the like. Among them, activated carbons chemically activated with KOH are especially preferred because there is a tendency that the capacitance thereof is larger than those obtained by stream-activation.

After the activation treatment, the activated carbon may be heat-treated in an atmosphere of an inert gas such as nitrogen, argon, helium or xenon at a temperature of usually 500 to 2,500° C., preferably 700 to 1,500° C. to remove unnecessary surface-functional groups or enhance a crystallinity of carbon for increasing an electron conductivity thereof. Further, the activated carbon may be heat-treated in a gas containing ammonia, hydrogen, steam, carbon dioxide, oxygen or air to introduce hetero-atoms such as hydrogen, oxygen or nitrogen, or surface-functional groups into the carbon skeleton thereof to control a rest potential thereof.

The average particle diameter of the activated carbon particles is preferably about 3 to about 40 $\mu$m. When the average particle diameter of the activated carbon particles is more than 40 $\mu$m, although the amount of a binder blended can be reduced, the amount of an electrolyte impregnated into the activated carbon particles may be decreased so that the internal resistance of the resultant electric double-layer capacitor may be increased. On the other hand, when the average particle diameter of the activated carbon particles is less than 3 $\mu$m, it may be required to blend therewith a binder in an amount of about 70% by weight or higher in order to obtain a sufficient strength of a molded product, so that the capacitance of the resultant electric double-layer capacitor may be decreased.

In the case of granular activated carbon, from the standpoint of increase in bulk density and reduction in internal resistance of the electrodes, it is more preferred that the average particle diameter thereof is not more than 30 $\mu$m.

The polarized electrodes comprising mainly activated carbon comprise the activated carbon, a conductive agent and a binder. Such polarized electrodes may be produced by conventionally known molding methods. For example, after a mixture of activated carbon and acetylene black is mixed with polytetrafluoroethylene, the obtained mixture is press-molded to obtain the electrodes. Further, only activated carbon may be sintered to form polarized electrodes without using the conductive agent and the binder. The polarized electrodes may be of any shape such as a thin coating film, a sheet-like or plate-like molded product or a plate-like molded product comprising a composite material.

As the preferred conductive agents used in the polarized electrodes, there may be exemplified conductive agents comprising at least one material selected from the group consisting of carbon black such as acetylene black or koechen black; natural graphite; thermally expanded graphite; carbon fibers; ruthenium oxide; titanium oxide; and metal fibers such as aluminum fiber or nickel fiber. Among them, acetylene black and koechen black are preferred because these carbon blacks can effectively improve a conductivity of the electrodes even by addition of a small amount thereof. When too large amount of the conductive agent is mixed with activated carbon, the content of activated carbon in the electrodes is decreased though the content is varied depending upon bulk density of the activated carbon. This results in decrease in a capacitance of the resultant capacitor. Accordingly, the amount of the conductive agent blended in the activated carbon electrodes is preferably about 5 to about 50% by weight, more preferably about 10 to about 30% by weight based on the weight of the activated carbon.

As the binders for the electrodes, there may be usually used at least one material selected from the group consisting of polytetrafluoroethylene, polyvinylidene fluoride, carboxymethyl cellulose, fluoro-olefin copolymer cross-linked polymer, polyvinyl alcohol, polyacrylic acid, polyimides, petroleum pitch, coal pitch and phenol resin.

In the present invention, the use of such a binder containing no carbon-fluorine bond is preferred. It is considered that if the carbon-fluorine bond is contained in the binder, there arise such disadvantages that cleavage of the carbon-fluorine bond tends to be caused, and further that ions or molecules in the electrolyte tend to be reacted with fluorine to produce decomposition products.

As the preferred binders, there may be exemplified binders constituted mainly by a carbon-carbon bond. Examples of such binders constituted mainly by a carbon-carbon bond may include polycyclic aromatic compounds such as coal tar pitch, petroleum pitch, phenol resin or furan resin. However, in the case where these polycyclic aromatic compounds are used as a binder for the electrodes as they are, there is a tendency that the durability of the resultant electric double-layer capacitor is deteriorated, since the polycyclic aromatic compounds contain a large amount of volatile components such as oxygen-containing functional groups or nitrogen-containing functional groups, which are partially soluble in a solvent of the electrolyte such as propylene carbonate. Therefore, after the polycyclic aromatic compounds are mixed with activated carbon and the mixture is molded, the obtained molded product may be heat-treated in an inert gas such as nitrogen or argon at a temperature of not less than a decomposition temperature of the polycyclic aromatic compounds, i.e., at 700 to 1,300° C. to remove the volatile components from the molded product. As a result, only a carbonaceous binder material remains in the molded product, so that the obtained products can be preferably used as activated carbon electrodes for electric double-layer capacitors. When the molded product is heat-treated at a temperature of more than 1,300° C., the specific surface area of the activated carbon electrodes is decreased due to shrinkage of pores of activated carbon, resulting in decrease in capacitance of the resultant electric double-layer capacitor.

In addition, the above-mentioned heat treatment of the molded product may be conducted under pressure using a hot press or the like to increase a bulk density of the molded product and enhance a capacitance of the resultant electric double-layer capacitor. The amount of these polycyclic aromatic compounds blended is preferably 10 to 70% by weight based on the weight of the molded product, though the amount is varied depending upon composition of volatile components, softening point or the like. When the amount of the polycyclic aromatic compounds blended exceeds 70% by weight, the content of the activated carbon in the molded product may be decreased, so that the capacitance of the resultant electric double-layer capacitor may be reduced, though the strength of the molded product is increased. Further, as the coal tar pitches or the petroleum pitches, the use of those pitches having a high softening point such as not less than 220° C. is preferred, because pores of the activated carbon can be prevented from being clogged thereby when subjected to the heat treatment. For similar reason, in the case where phenol resin is used as a binder, the use of thermosetting phenol resins is more preferable as compared to the use of thermoplastic phenol resins.

In addition to organic binder materials such as the above-mentioned polycyclic aromatic compounds, in order to enhance the adhesion between the activated carbon particles and the binder upon molding, there may also be used an aqueous solution containing 1 to 30% by weight of a thermoplastic resin such as polyethylene glycol, polyvinyl alcohol, ethylene glycol, propylene glycol or carboxymethyl cellulose, or a solution obtained by dissolving 2 to 40% by weight of a heat-decomposable resin such as polyolefin-based polymers, acrylic resins, polystyrene resins or polyethylene resins in an organic solvent such as acetone or dimethyl sulfoxide. The solution may be added to a mixture of the activated carbon and the binder in an amount of 10 to 40% by weight based on the total weight of the activated carbon and the binder, followed by heat-treating to obtain an activated carbon molded product.

The current collectors usable in the present invention are not restricted to particular ones as long as the current collectors can show appropriate electrochemical or chemical corrosion resistance. Examples of preferable materials for the current collectors may include stainless steel, aluminum, titanium, tantalum or the like for a positive electrode, and stainless steel, nickel, copper or the like for a negative electrode.

In order to obtain a capacitor having a large applicable voltage and a large energy density, the use of an non-aqueous electrolyte is preferred. As solutes for the non-aqueous electrolyte, there is preferably used a salt obtained by combining a quaternary onium cation such as $R_4N^+$, $R_4P^+$ (wherein R is an alkyl group represented by the formula of $C_nH_{2n+1}$) or triethylmethyl ammonium ions and an alkali metal cation such as lithium ion or potassium ion, with an anion such as $BF_4^-$, $PF_6^-$, $ClO_4^-$ and $CF_3SO_3^-$. Among them, the use of a salt obtained by combining the quaternary onium cation with the anion such as $BF_4^-$, $PF_6^-$, $ClO_4^-$ and $CF_3SO_3^-$ is more preferred. The concentration of these salts in the non-aqueous electrolyte is preferably 0.1 to 2.5 mol/liter, more preferably 0.3 to 2.1 mol/liter, still more preferably 1.0 to 2.1 mol/liter, in order to sufficiently exhibit properties of the electric double-layer capacitor.

The solvents used in the present invention are not restricted to particular ones. Examples of the preferred solvents may include at least one organic solvent selected from the group consisting of propylene carbonate, ethylene carbonate, butylene carbonate, dimethyl carbonate, methylethyl carbonate, diethyl carbonate, sulfolane, methyl sulfolane, γ-butyrolactone, γ-valerolactone, N-methyloxazolidinone, dimethyl sulfoxide and trimethyl sulfoxide, though not limited thereto. From the standpoints of electrochemical or chemical stability and excellent electric conductivity, the use of at least one organic solvent selected from the group consisting of propylene carbonate, ethylene carbonate, butylene carbonate, dimethyl carbonate, methylethyl carbonate, diethyl carbonate, sulfolane, methyl sulfolane and γ-butyrolactone, is more preferred.

Especially preferred solvents are those comprising mainly a mixed solvent of propylene carbonate and ethylene carbonate. The mixing ratio of ethylene carbonate to propylene carbonate is preferably 0.1:1 to 4:1 by volume, though not restricted thereto. In addition, in order to enhance an electric conductivity, electrochemical stability and chemical stability of the electrolyte, the mixed solvent of propylene carbonate and ethylene carbonate may be mixed with at least one organic solvent selected from the group consisting of butylene carbonate, dimethyl carbonate, methylethyl carbonate, diethyl carbonate, sulfolane, methyl sulfolane, γ-butyrolactone, γ-valerolactone, N-methyloxazolidinone, dimethyl sulfoxide, trimethyl sulfoxide, acetonitrile and propionitrile. From the standpoint of achieving a high withstand voltage of the capacitor, the water content of the non-aqueous electrolyte is not more than 200 ppm, preferably not more than 50 ppm.

In accordance with the present invention, there can be provided a capacitor which has a larger maximum capacitance than those of the conventional ones, and is free from deterioration in properties thereof.

EXAMPLES

The present invention is described in more detail by the following examples, but these examples are not intended to limit the scope of the present invention.

Example 1

A mixture of 80% by weight of coal-based activated carbon particles activated with KOH (specific surface area: 2,270 m²/g, average particle diameter: 10 μm), 10% by weight of acetylene black and 10% by weight of polytetrafluoroethylene were kneaded and then press-molded under a pressure of 50 Kgf/cm² (by a hydraulic press) into a disc-like molded product having a diameter of 10 mm and a thickness of 0.5 mm, using a tablet machine manufactured by NIHON BUNKO CO., LTD. The thus obtained disc-like molded product was dried at 300° C. under vacuum pressure of not more than 0.1 torr for 3 hours to form an electrode. Using the thus obtained electrode made mainly of activated carbon, a coin-type cell as shown in FIG. 1 was assembled in an argon atmosphere. In assembling of the cell, the activated carbon electrode as a positive electrode 12 was sufficiently impregnated with a propylene carbonate solution containing LiBF₄ in an amount of one mol/liter, and then bonded to an inner bottom surface of a stainless steel casing 11. Further, after the above propylene carbonate solution of LiBF₄ was filled in the stainless steel casing 11, a polyethylene separator 14 produced by Mitsubishi Chemical Corporation, a polypropylene gasket 13, a metal lithium electrode as a negative electrode having a diameter of 10 mm and a thickness of 0.5 mm and a stainless steel top cover 16 in turn were placed over the activated carbon electrode 12 in an overlapped relation to each other. The casing 11 and the top cover 16 were caulked together to form a coin-type cell.

The activated carbon electrode was doped with lithium by short-circuiting in order to reduce a rest potential of the activated carbon electrode. Specifically, the casing 11 (positive electrode side) and the top cover 16 (negative electrode side) of the thus formed coin-type cell were contacted with respective lead wires for about 10 seconds to cause short-circuiting between the positive and negative electrodes. After short-circuiting, the potential difference between the positive and negative electrodes was measured by a voltmeter. As a result, it was determined that the potential difference between the positive and negative electrodes was 2.47 V (relative to Li/Li$^+$) which was a rest potential (relative to Li/Li$^+$) of the Li-doped activated carbon electrode on a positive electrode side. The coin-type cell was then charged at a constant current of 1.16 mA for 50 minutes by using a charge and discharge apparatus HJ-201B manufactured by HOKUTO DENKO CO., LTD., followed by measuring a potential of the cell. As a result, it was determined that the potential of the cell after charging was 4.06 V.

Comparative Example 1

The same procedure as defined in Example 1 was conducted except that the short-circuiting between the metal lithium electrode and the activated carbon electrode was not conducted, thereby assembling a coin-type cell. The rest potential of the thus assembled coin-type cell was 2.99 V (relative to Li/Li$^+$) and the potential after charging at constant current of 1.16 mA for 50 minutes was 4.56 V, which value was more than a decomposition voltage (about 4.4 V) of the electrolyte on a positive electrode side. From the comparison between the results of Example 1 and Comparative Example 1, it was recognized that the capacitor according to the present invention exhibited a higher energy density that those of the conventional ones.

Example 2

Figure 2:
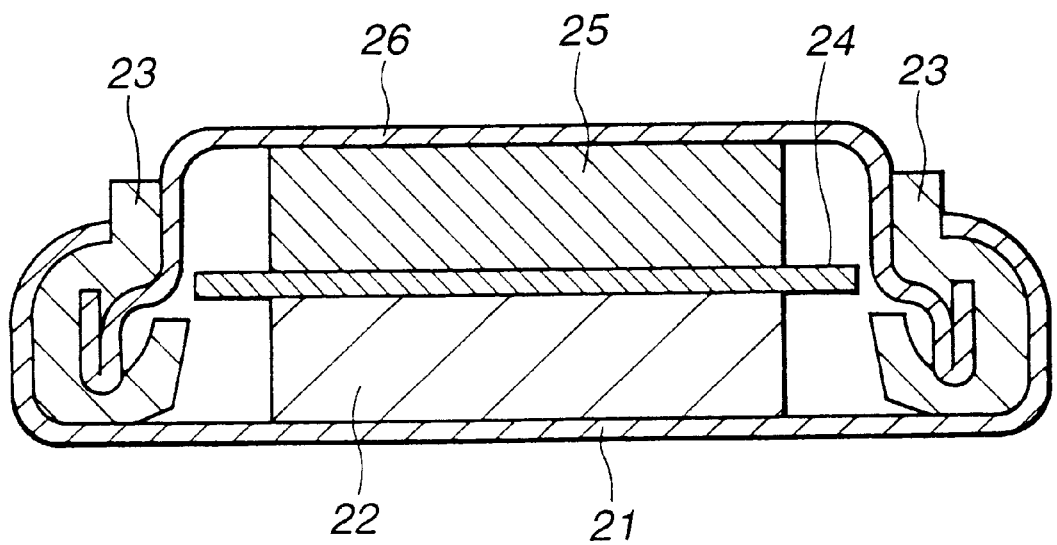
FIG. 2 is a schematic cross-sectional view of a capacitor used in Examples according to the present invention.

The same procedure as defined in Example 1 was conducted to produce a coin-type cell whose rest potential was reduced by short-circuiting between the positive and negative electrodes. Thereafter, the thus-produced coin-type cell was disassembled in an argon atmosphere to take only an activated carbon molded product on a positive electrode side out of the cell. The above-mentioned procedure was repeated to obtain two activated carbon molded products having a rest potential of about 2.5 V (relative to Li/Li$^+$). Next, the two molded products were sufficiently impregnated with a propylene carbonate solution containing (C$_2$H$_5$)$_4$NBF$_4$ in an amount of 1 mol/liter to obtain a positive electrode 22 and a negative electrode 25. A coin-type cell was assembled by arranging in a steel casing 21 and stainless steel top cover 2b sealed by a polypropylene gasket 23 a separator 24 between the thus obtained positive and negative electrodes 22 and 25 in the same manner as defined above, thereby obtaining an electric double-layer capacitor as shown in FIG. 2. After a voltage of 2.8 V was applied to the thus obtained electric double-layer capacitor at room temperature for one hour, the capacitor was discharged at a constant current of 1.16 mA. As a result, it was determined that an initial capacitance of the capacitor was 1.24 F. In order to evaluate a long-term operation reliability of the capacitor under the condition of applying a voltage thereto in an accelerated manner, the capacitor was placed in a thermostatic oven maintained at 70° C., and a voltage of 2.8 V was applied to the capacitor. After the elapse of 500 hours, the capacitance of the capacitor was measured and determined to be 1.22 F. Accordingly, it was recognized that the capacitor exhibited almost no deterioration in capacitance.

Comparative Example 2

The same procedure as defined in Example 2 was conducted except that the activated carbon electrode used in Comparative Example 1 which was not subjected to the short-circuiting between the positive and negative electrodes, was used, thereby assembling an electric double-layer capacitor. The thus obtained electric double-layer capacitor exhibited an initial capacitance of 1.23 F. Further, the capacitance of the capacitor after the accelerated evaluation test was 1.00 F. It was recognized that the capacitor was considerably deteriorated in its capacitance.

Example 3

An electric double-layer capacitor was produced in the same procedure as defined in Example 2. After a voltage of 4.0 V was applied to the thus obtained electric double-layer capacitor at room temperature for one hour, the capacitor was discharged at a constant current of 1.16 mA, so that it was determined that the initial capacitance of the capacitor was 1.28 F. Further, after the above charge-discharge cycle of the capacitor was repeated 50 times under the same condition to measure a capacitance of the capacitor. The measurement showed that the capacitance of the capacitor was 1.27 F. Even when a high voltage was repeatedly applied to the capacitor, the capacitor exhibited almost no deterioration in capacitance. Accordingly, the obtained capacitor had a large energy density and was excellent in cycle-repeating property.

Comparative Example 3

The same procedure as defined in Example 3 was conducted except that the electric double-layer capacitor obtained in Comparative Example 2 was used. After a voltage of 4.0 V was applied to the capacitor, the initial capacitance of the capacitor was 1.26 F. After the charge-discharge cycle was repeated 50 times, the capacitor had a capacitance as low as 0.90 F.

Example 4

(1) Method of Controlling a Rest Potential of Carbonaceous Electrode

A mixture of 80% by weight of phenol resin-based activated carbon particles activated with KOH (specific surface area: 1,900 m$^2$/g, average particle diameter: 10 μm), 10% by weight of acetylene black and 10% by weight of polytetrafluoroethylene was kneaded and then press-molded under a pressure of 50 Kgf/cm$^2$ (by a hydraulic press) into a disc-like molded product having a diameter of 10 mm and a thickness of 0.5 mm, using a tablet machine manufactured by NIHON BUNKO CO., LTD. The thus obtained disc-like molded product was dried at 300° C. under vacuum pressure of not more than 0.1 torr for 3 hours to form an electrode. The above-mentioned procedure was repeated to obtain two electrodes. The thus obtained two electrodes between which a polyethylene separator produced by Mitsubishi Chemical Corporation. was interposed, were entirely sandwiched between two platinum plates as current collectors. Further, the sandwiched product was interposed between two 5 mm-thick Teflon plates having four boltholes and bolt-tightened therebetween from outside so as to bring the current collectors, the activated carbon electrodes and the separator into close contact with each other, thereby assembling an open cell-type capacitor. The thus obtained open cell-type capacitor and a lithium electrode prepared by press-attaching a metal lithium foil to a tip end of a platinum plate were immersed in a beaker filled with a propylene carbonate solution containing LiBF$_4$ in an amount of 1 mol/liter. Next, the lithium electrode and the activated carbon electrode were connected through a lead wire to each other and short-circuited for about one hour. After shortcircuiting, a voltmeter was connected between the activated carbon electrode and the lithium electrode to measure a rest potential of the activated carbon electrode, so that it was determined that the rest potential was 2.26 V (relative to Li/Li$^+$).

(2) Method of Producing Electric Double-layer Capacitor

The above-obtained two activated carbon electrodes having a rest potential of 2.26 V were sufficiently impregnated with a solution containing 1 mol/liter of $(C_2H_5)_4NBF_4$ in propylene carbonate and ethylene carbonate (mixing volume ratio: 1:1), thereby obtaining positive and a negative electrodes. A polyethylene separator was interposed between the thus obtained positive and negative electrodes, thereby obtaining an coin cell-type electric double-layer capacitor as shown in FIG. 2. In this case, the casing acted as a current collector. Using a charge and discharge apparatus HJ-201B manufactured by HOKUTO DENKO CO., LTD., a voltage of 2.8 V was applied to the thus obtained electric double-layer capacitor at room temperature for one hour, and then the capacitor was discharged at a constant current of 1.16 mA. As a result, it was determined that an initial capacitance of the capacitor was 1.90 F. In order to evaluate a long-term operation. reliability of the capacitor under the voltage-applying condition in an accelerated manner, the capacitor was placed in a thermostatic oven maintained at 70° C., and a voltage of 2.8 V was applied to the capacitor. As a result, it was determined that a rate of change in capacitance of the capacitor after the elapse of 500 hours was −2.8%.

Example 5

The same procedure as defined in Example 4 was conducted except that the short-circuiting between the lithium electrode and the activated carbon electrode was conducted for 30 minutes, thereby obtaining an electric double-layer capacitor. The rest potential of the activated carbon electrode was 2.58 V, and the initial capacitance of the electric double-layer capacitor was 1.88 F. Further, it was determined that the rate of change in capacitance of the capacitor after the elapse of 500 hours was −2.7%.

Example 6

An activated carbon electrode was produced in the same manner as defined in Example 5.

The lithium content of the obtained activated carbon electrode was measured by an atomic absorption spectrophotometer "SPECTR AA-40P" manufactured by VARIAN INSTRUMENT LTD., so that it was determined that the lithium content of the activated carbon electrode was 0.11% by weight. Using a charge and discharge apparatus HJ-201B manufactured by HOKUTO DENKO CO., LTD., a voltage of 2.8 V was applied to the obtained open cell-type capacitor at room temperature for one hour to measure a potential of the capacitor on a positive electrode side. The potential was 4.1 V (relative to Li/Li$^+$).

Figure 3:
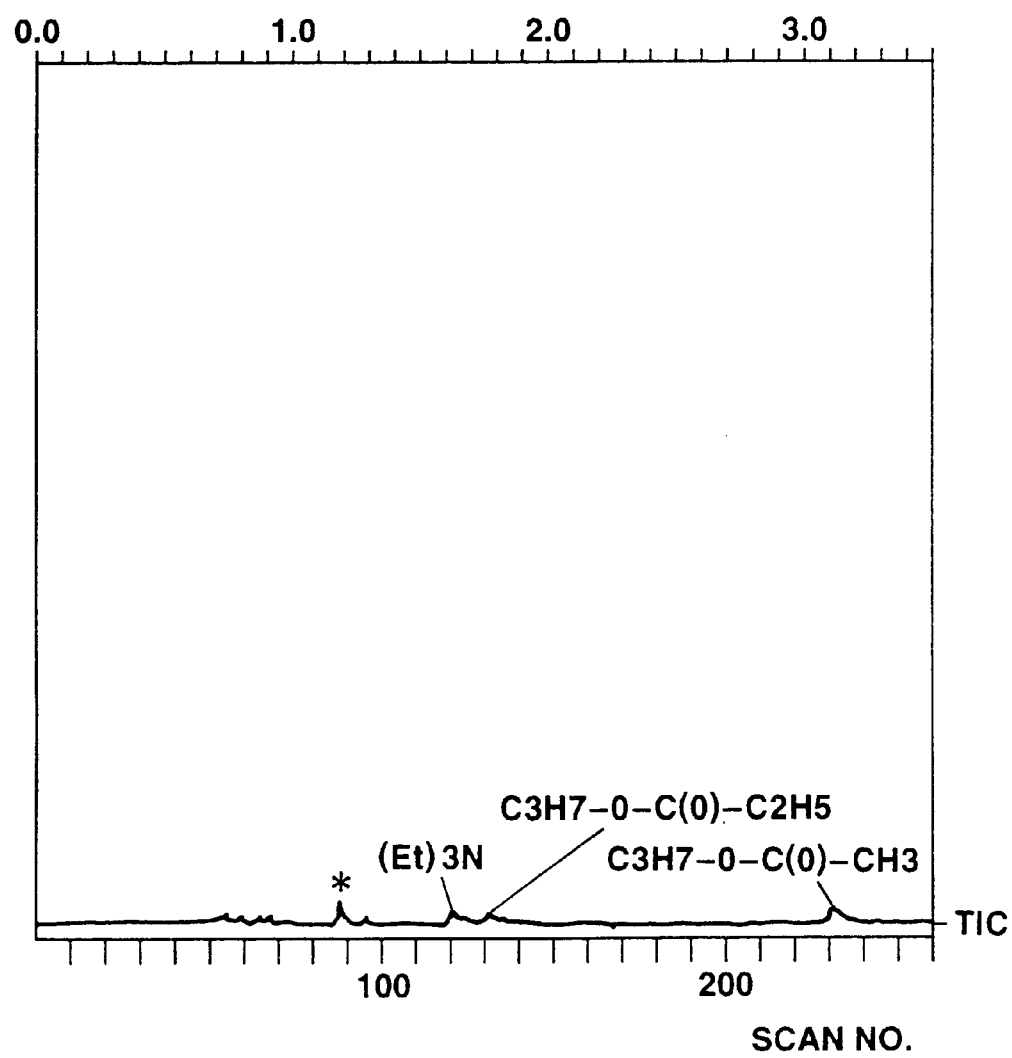
FIG. 3 is a view showing a mass spectrum measured in Example 6 according to the present invention.

The above-obtained two Li-doped activated carbon electrodes were sufficiently impregnated with a propylene carbonate solution containing $(C_2H_5)_4NBF_4$ in an amount of 1 mol/liter, thereby obtaining positive and a negative electrodes. A polyethylene separator was interposed between the thus obtained positive and negative electrodes, thereby obtaining a coin cell-type electric double-layer capacitor as shown in FIG. 2. Using a charge and discharge apparatus HJ-201B manufactured by HOKUTO DENKO CO., LTD., a voltage of 2.8 V was applied to the obtained electric double-layer capacitor at room temperature for one hour, and then the capacitor was discharged at a constant current of 1.16 mA, so that it was determined that the initial capacitance of the capacitor was 1.81 F. In order to evaluate a long-term operation reliability of the capacitor under the voltage-applying condition in an accelerated manner, the capacitor was placed in a thermostatic oven maintained at 70° C., and then a voltage of 2.8 V was applied to the capacitor. After the elapse of 500 hours, the capacitance of the capacitor was measured and determined to be 1.73 F. Accordingly, the capacitor exhibited almost no deterioration in capacitance. The rate of change in capacitance of capacitor was −4.4%. Further, in order to determine whether or not any decomposition product of the electrolyte was produced, after the accelerated operation reliability evaluation test, the electrolyte in the coin cell-type capacitor was poured into a mass spectrometer M-2500 manufactured by HITACHI LIMITED which was connected to a gas chromatography using methyl silicone as a liquid phase (GC-MS apparatus). The obtained mass spectrum is shown in FIG. 3. It was determined from FIG. 3 that almost no decomposition of the electrolyte was caused though only a small amount of decomposition products such as triethyl amine or esters were contained in the electrolyte after the accelerated operation reliability evaluation test.

Example 7

The same procedure as defined in Example 6 was conducted except that the short-circuiting between the lithium electrode and the activated carbon electrode was conducted for one hour, thereby obtaining an electric double-layer capacitor. The lithium content of the obtained activated carbon electrode was 0.16% by weight. The potential of the capacitor on a positive electrode side after charging at 2.8 V was 3.9 V (relative to Li/Li$^+$). In addition, the initial capacitance of the obtained electric double-layer capacitor was 1.82 F, and further the capacitance after the accelerated reliability evaluation test was 1.73 F. The rate of the change in capacitance of the capacitor was −4.9%. Accordingly, it was determined that almost no deterioration in capacitance of the capacitor was caused.

Comparative Example 4

The same procedure as defined in Example 6 was conducted except that the short-circuiting between the lithium electrode and the activated carbon electrode was conducted for 24 hours, thereby obtaining an electric double-layer capacitor. The lithium content of both the obtained activated carbon electrodes was 2.1% by weight. The potential of the capacitor on a positive electrode side after charging at 2.8 V was 3.0 V (relative to Li/Li$^+$). In addition, the initial capacitance of the obtained electric double-layer capacitor was 1.13 F. Accordingly, it was determined that the capacitance of the capacitor was considerably lower than that of Example 6.

Comparative Example 5

The same procedure as defined in Example 6 was conducted except that the short-circuiting between the lithium electrode and the activated carbon electrode was conducted for 5 seconds, thereby obtaining an electric double-layer capacitor. The lithium content of both the obtained activated carbon electrodes was 0.005% by weight. The potential of the capacitor on a positive electrode side after charging at 2.8 V was 4.4 V (relative to Li/Li$^+$). In addition, the initial capacitance of the obtained electric double-layer capacitor was 1.82 F, and further the capacitance after the accelerated reliability evaluation test was 1.50 F. Accordingly, it was determined that the capacitance of the capacitor was considerably deteriorated.

Comparative Example 6

The same procedure as defined in Example 6 was conducted except that no short-circuiting between the lithium electrode and the activated carbon electrode was conducted, thereby obtaining an electric double-layer capacitor. The potential of the positive electrode side after charging at 2.8 V was 4.4 V (relative to Li/Li$^+$). In addition, the initial capacitance of the obtained electric double-layer capacitor was 1.83 F, and further the capacitance after the accelerated reliability evaluation test was 1.41 F. Accordingly, it was determined that the capacitance of the capacitor was considerably deteriorated.

Figure 4:
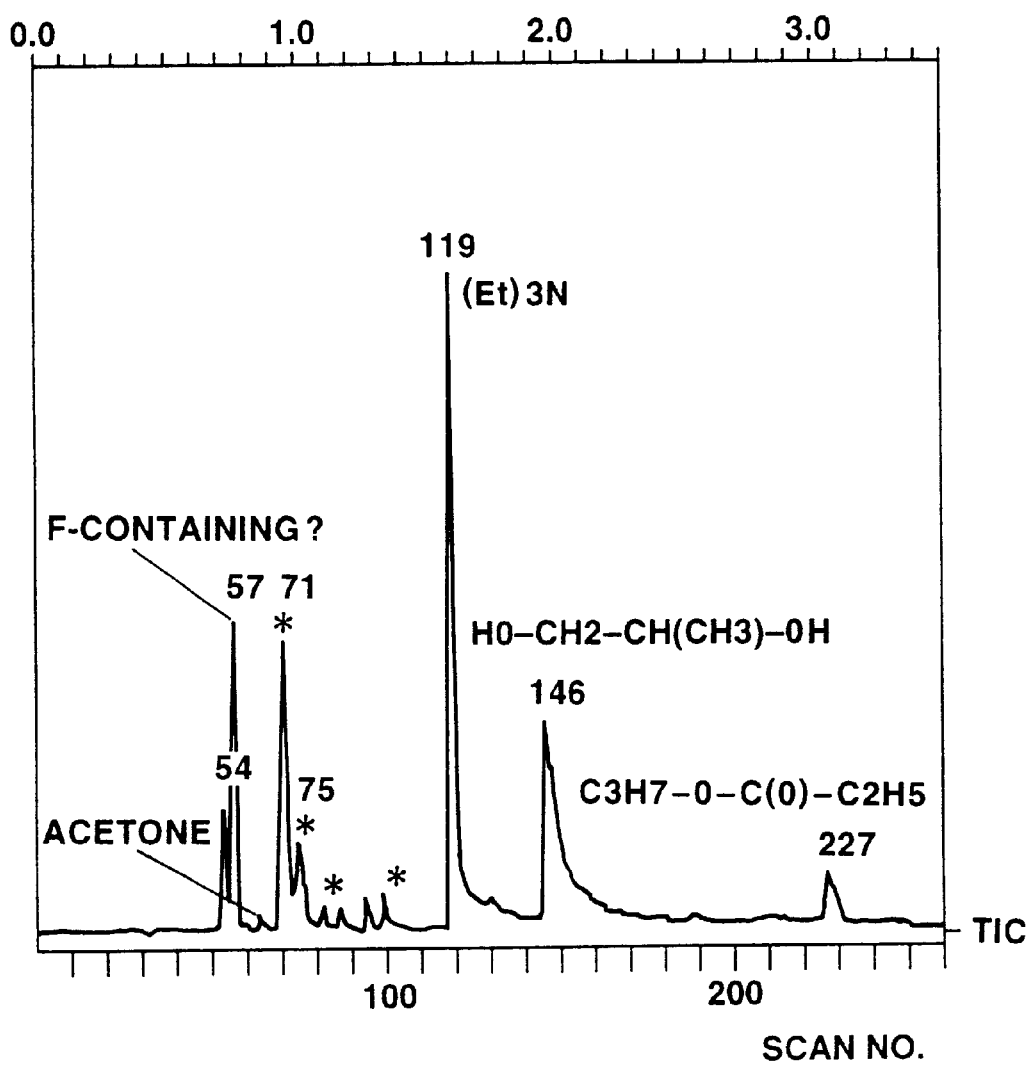
FIG. 4 is a view showing a mass spectrum measured in Comparative Example 6.

The electrolyte in the coin cell-type capacitor after the accelerated reliability evaluation test was subjected to a mass spectrometric analysis using the GC-MS apparatus in the same manner as defined in Example 6. The obtained mass spectrum is shown in FIG. 4. It was determined from FIG. 4 that a large amount of decomposition products such as triethyl amine or esters were contained in the electrolyte after the accelerated reliability evaluation test.

Example 8

(1) Method of Doping Activated Carbon Electrode with Lithium

A mixture of 80% by weight of coke-based activated carbon particles activated with KOH and containing no lithium (specific surface area: 1,550 m$^2$/g, average particle diameter: 10 μm), 10% by weight of acetylene black and 10% by weight of polytetrafluoroethylene was kneaded and then press-molded under a pressure of 50 Kgf/cm$^2$ (by a hydraulic press) into a disc-like molded product having a diameter of 10 mm and a thickness of 0.5 mm, using a tablet machine manufactured by NIHON BUNKO CO., LTD. The thus obtained disc-like molded product was dried at 300° C. under vacuum pressure of not more than 0.1 torr for 3 hours to form an electrode. The above-mentioned procedure was repeated to obtain two electrodes. The thus obtained two electrodes between which a polyethylene separator produced by Mitsubishi Chemical Corporation was interposed, were entirely sandwiched between two platinum plates as current collectors. Further, the sandwiched product was interposed between two 5 mm-thick Teflon plates having four boltholes and bolt-tightened therebetween from outside so as to bring the current collectors, the activated carbon electrodes and the separator into close contact with each other, thereby assembling an open cell-type capacitor. The thus obtained open cell-type capacitor and a lithium electrode prepared by press-attaching a metal lithium foil to a tip end of a platinum plate were immersed in a beaker filled with a propylene carbonate solution containing LiBF$_4$ in an amount of 1 mol/liter. Next, the lithium electrode and the activated carbon electrode were connected through a lead wire to each other and short-circuited for about one hour. Thereafter, the capacitor was disassembled to remove the two activated carbon electrodes therefrom. The lithium contents of the activated carbon electrodes were measured by an atomic absorption spectrophotometer "SPECTR AA-40P" manufactured by VARIAN INSTRUMENT LTD., so that it was determined that the lithium contents were 0.26% by weight. Further, by using a charge and discharge apparatus HJ-201B manufactured by HOKUTO DENKO CO., LTD., a voltage of 3.4 V was applied to the open cell-type capacitor at room temperature for one hour, and then the potentials of the capacitor on positive and negative electrode sides were measured so that it was determined that the potential on a positive electrode side was 4.0 V (relative to Li/Li$^+$) and the potential on a negative electrode side was 0.6 V (relative to Li/Li$^+$). The same. potential measurements were conducted except that the voltage applied to the open celltype capacitor was changed to 3.8 V, so that it was determined that the potential on a positive electrode side was 4.2 V (relative to Li/Li$^+$) and the potential on a negative electrode side was 0.4 V (relative to Li/Li$^+$).

(2) Method of Producing a Capacitor using Li-doped Activated Carbon Electrodes

The above-obtained two Li-doped activated carbon electrodes were sufficiently impregnated with a solution containing 1 mol/liter of $(C_2H_5)_4NBF_4$ in propylene carbonate and ethylene carbonate, thereby obtaining positive and negative electrodes. A polyethylene separator was interposed between the thus obtained positive and negative electrodes, thereby obtaining a coin cell-type electric double-layer capacitor as shown in FIG. 2. Using a charge and discharge apparatus HJ-201B manufactured by HOKUTO DENKO CO., LTD., after a voltage of 3.4 V was applied to the thus obtained electric double-layer capacitor at room temperature for one hour, the capacitor was discharged at a constant current of 1.16 mA. As a result, it was determined that an initial energy density of the capacitor was 15.1 Wh/l. The same measurement was conducted except that the voltage applied to the capacitor was changed to 3.8 V, so that it was determined that the initial energy density of the capacitor was 19.2 Wh/l. In order to evaluate a long-term operation reliability of the capacitor under the voltage-applying condition in an accelerated manner, the capacitor was placed in a thermostatic oven maintained at 70° C., and a voltage of 3.4 V was applied to the capacitor. As a result, it was determined that the energy density of the capacitor after the elapse of 500 hours was 14.5 Wh/l (−4%). Accordingly, almost no deterioration in energy density of the capacitor was caused. Further, when a voltage of 3.8 V was applied to the capacitor, the energy density of the capacitor after the elapse of 500 hours was 18.2 Wh/l (−5%). Accordingly, it was recognized that the capacitor exhibited almost no change in energy density from the initial energy density even after the 500-hours evaluation test.

Example 9

The same procedure as defined in Example 8 was conducted except that coal pitch-based activated carbon particles activated with KOH (specific surface area: 1,550 m$^2$/g, average particle diameter: 10 μm) was used instead of the coke-based activated carbon particles, thereby obtaining an electric double-layer capacitor. The lithium content of both the activated carbon electrodes was 0.16% by weight. The potentials of the capacitor on positive and negative electrode sides after charging at 3.4 V were 3.9 V and 0.5 V (relative to Li/Li$^+$), respectively. Similarly, in the case where the capacitor was charged by applying a voltage of 3.8 V thereto, the potentials of the capacitor on positive and negative electrode sides were 4.1 V and 0.3 V (relative to Li/Li$^+$), respectively. Further, in the case where the voltage of 3.4 V was applied to the obtained electric double-layer capacitor, the initial energy density thereof was 10.5 Wh/l, and in the case where the voltage of 3.8 V was applied, the initial energy density was 13.4 Wh/l. Furthermore, in the case where the voltages of 3.4 V and 3.8 V were applied to the capacitor, the energy densities thereof after the elapse of 500 hours were 10.0 Wh/l (−5%) and 12.5 Wh/l (−7%), respectively.

Example 10

The same procedure as defined in Example 8 was conducted except that coal pitch-based activated carbon particles activated with KOH (specific surface area: 550 m$^2$/g, average particle diameter: 10 µm) and a solution containing 1 mol/liter of triethylmethyl amine in propylene carbonate and ethylene carbonate electrolyte were used instead of those used in Example 8, thereby obtaining an electric double-layer capacitor. The lithium contents of both the activated carbon electrodes were 0.20% by weight. The potentials of the capacitor on positive and negative electrode sides after charging at 3.4 V were 3.9 V and 0.5 V (relative to Li/Li$^+$), respectively. Similarly, in the case where the capacitor was charged by applying a voltage of 3.8 V thereto, the potentials of the capacitor on positive and negative electrode sides were 4.1 V and 0.3 V (relative to Li/Li$^+$), respectively. Further, in the case where the voltage of 3.4 V was applied to the obtained electric double-layer capacitor, the initial energy density thereof was 16.6 Wh/l, and in the case where the voltage of 3.8 V was applied, the initial energy density was 23.3 Wh/l. Furthermore, in the case where the voltages of 3.4 V and 3.8 V were applied to the capacitor, the energy densities thereof after the elapse of 500 hours were 16.0 Wh/l (−4%) and 21.5 Wh/l (−8%), respectively.

Comparative Example 7

The same procedure as defined in Example 8 was conducted except that the short-circuiting between the lithium electrode and the activated carbon electrode was conducted for 28 hours, thereby obtaining an electric double-layer capacitor. The lithium contents of both the activated carbon electrodes were 2.3% by weight. When the voltages of 3.4 V and 3.8 V were applied to the obtained electric double-layer capacitor, the potential drop was caused within one hour, so that it was impossible to measure the energy density of the capacitor.

Comparative Example 8

The same procedure as defined in Example 8 was conducted except that the short-circuiting between the lithium electrode and the activated carbon electrode was conducted for 20 seconds, thereby obtaining an electric double-layer capacitor. The lithium contents of both the activated carbon electrodes were 0.005% by weight. The potentials of the capacitor on positive and negative electrode sides after charging at 3.4 V were 4.5 V and 1.1 V (relative to Li/Li$^+$), respectively. Similarly, in the case where the capacitor was charged by applying a voltage of 3.8 V thereto, the potentials of the capacitor on positive and negative electrode sides were 4.6 V and 0.8 V (relative to Li/Li$^+$), respectively. Further, in the case where the voltage of 3.4 V was applied to the obtained electric double-layer capacitor, the initial energy density thereof was 10.9 Wh/l, and in the case where the voltage of 3.8 V was applied, the initial energy density was 13.7 Wh/l. Furthermore, in the case where the voltages of 3.4 V and 3.8 V were applied to the capacitor, the energy densities thereof after the elapse of 500 hours were 6.2 Wh/l (−43%) and 6.4 Wh/l (−53%), respectively. Accordingly, it was recognized that the capacitor deteriorated considerably in energy density after the elapse of 500 hours.

Comparative Example 9

The same procedure as defined in Example 8 was conducted except that no short-circuiting between the lithium electrode and the activated carbon electrode was conducted, thereby obtaining an electric double-layer capacitor. The potentials of the capacitor on positive and negative electrode sides after charging at 3.4 V were 4.6 V and 1.2 V (relative to Li/Li$^+$), respectively. Further, in the case where the voltage of 3.4 V was applied to the obtained electric double-layer capacitor, the initial energy density thereof was 10.8 Wh/l, and in the case where the voltage of 3.8 V was applied, the initial energy density was 13.7 Wh/l. Furthermore, in the case where the voltages of 3.4 V and 3.8 V were applied to the capacitor, the energy densities thereof after the elapse of 500 hours were 5.5 Wh/l (−49%) and 5.5 Wh/l (−60%), respectively. Accordingly, it was recognized that the capacitor deteriorated considerably in energy density after the elapse of 500 hours.

Example 11

(1) Method of Doping Activated Carbon Electrode with Lithium

A mixture of 80% by weight of phenol resin-based activated carbon particles activated with KOH (specific surface area: 1,900 m$^2$/g, average particle diameter: 10 µm), 10% by weight of acetylene black and 10% by weight of polytetrafluoroethylene was kneaded and then press-molded under a pressure of 50 Kgf/cm$^2$ (by a hydraulic press) into a disc-like molded product having a diameter of 10 mm and a thickness of 0.5 mm, using a tablet machine manufactured by NIHON BUNKO CO., LTD. The thus obtained disc-like molded product was dried at 300° C. under vacuum pressure of not more than 0.1 torr for 3 hours to form an electrode. The above-mentioned procedure was repeated to obtain two electrodes. The thus obtained two electrodes between which a polyethylene separator produced by Mitsubishi Chemical Corporation was interposed, were entirely sandwiched between two platinum plates as current collectors. Further, the sandwiched product was interposed between two 5 mm-thick Teflon plates having four boltholes and bolt-tightened therebetween from outside so as to bring the current collectors, the activated carbon electrodes and the separator into close contact with each other, thereby assembling an open cell-type capacitor. The thus obtained open cell-type capacitor and a lithium electrode prepared by press-attaching a metal lithium foil to a tip end of a platinum plate were immersed in a beaker filled with a propylene carbonate solution containing LiBF$_4$ in an amount of 1 mol/liter. Next, the lithium electrode and the activated carbon electrodes were connected through a lead wire to each other and short-circuited for about one hour. After short-circuiting, a voltmeter was connected between the activated carbon electrode and the lithium electrode to measure a rest potential of the respective activated carbon electrodes, so that it was determined that the rest potential thereof was 2.20 V (relative to Li/Li$^+$). Thereafter, the capacitor was disassembled to remove the two activated carbon electrodes therefrom.

(2) Method of Producing an Electric Double-layer Capacitor

The above-obtained two activated carbon electrodes having a rest potential of 2.26 V were sufficiently impregnated with a solution containing 1 mol/liter of (C$_2$H$_5$)$_4$NBF$_4$ in propylene carbonate and ethylene carbonate (mixing volume ratio: 1:1), thereby obtaining positive and negative electrodes. A polyethylene separator was interposed between the thus obtained positive and negative electrodes, thereby obtaining a coin cell-type electric double-layer capacitor as shown in FIG. 2.

Using a charge and discharge apparatus HJ-201B manufactured by HOKUTO DENKO CO., LTD., a voltage of 3.4 V was applied to the thus obtained electric double-layer capacitor at room temperature for one hour, and then the capacitor was discharged at a constant current of 1.16 mA. As a result, it was determined that an initial energy density of the capacitor was 11.6 Wh/l. The same measurement was conducted except that the voltage applied to the capacitor was changed to 3.8 V, so that it was determined that the initial energy density of the capacitor was 13.0 Wh/l. In order to evaluate a long-term operation reliability of the capacitor under the voltage-applying condition in an accelerated manner, the capacitor was placed in a thermostatic oven maintained at 70° C., and a voltage of 3.4 V was applied to the capacitor. As a result, it was determined that a rate of change in energy density of the capacitor after the elapse of 500 hours was −10%. Accordingly, it was recognized that the capacitor exhibited almost no change in energy density from the initial energy density even after the 500-hours evaluation test. Further, even in the case where the voltage of 3.8 V was applied, the rate of change in energy density of the capacitor after the elapse of 500 hours was −16%.

Example 12

The same procedure as defined in Example 11 was conducted except that coal pitch-based activated carbon particles activated with KOH (specific surface area: 560 $m^2/g$, average particle diameter: 10 $\mu$m) was used instead of the phenol resin-based activated carbon particles and the rest potential of the activated carbon electrodes was controlled to 2.11 V, thereby obtaining an electric double-layer capacitor. The obtained electric double-layer capacitor exhibited an initial energy density of 16.6 Wh/l when a voltage of 3.4 V was applied thereto, and an initial energy density of 23.3 Wh/l when a voltage of 3.8 V was applied thereto. Further, in the case where the voltages of 3.4 V and 3.8 V were applied to the capacitor, the rates of change in energy density thereof after the elapse of 500 hours were −7% and −11%, respectively.

Example 13

The same procedure as defined in Example 11 was conducted except that petroleum coke-based activated carbon particles activated with KOH (specific surface area: 1,550 $m^2/g$, average particle diameter: 10 $\mu$m) was used instead of the phenol resin-based activated carbon particles and the rest potential of the activated carbon electrodes was controlled to 1.71 V (relative to Li/Li$^+$), thereby obtaining an electric double-layer capacitor. The obtained electric double-layer capacitor exhibited an initial energy density of 15.1 Wh/l when a voltage of 3.4 V was applied thereto, and an initial energy density of 19.2 Wh/l when a voltage of 3.8 V was applied thereto. Further, in the case where the voltages of 3.4 V and 3.8 V were applied to the capacitor, the rates of change in energy density thereof after the elapse of 500 hours were −4% and −5%, respectively.

Comparative Example 10

The same procedure as defined in Example 4 was conducted except that no short-circuiting between the lithium electrode and the activated carbon electrodes was conducted, thereby obtaining an electric double-layer capacitor. The rest potential of the activated carbon electrodes was 3.05 V. The obtained electric double-layer capacitor exhibited an initial capacitance of 1.89 F. Further, the rate of change in capacitance of the capacitor after the elapse of 500 hours were −13%.

Comparative Example 11

The same procedure as defined in Example 4 was conducted except that no short-circuiting between the lithium electrode and the activated carbon electrodes was conducted and a propylene carbonate solution containing 1 mol/liter of $(C_2H_5)_4NBF_4$ was used as an electrolyte, thereby obtaining an electric double-layer capacitor. The rest potential of the activated carbon electrodes was 3.05 V. The obtained electric double-layer capacitor exhibited an initial capacitance of 1.83 F. Further, the rate of change in capacitance of the capacitor after the elapse of 500 hours were −23%.

Example 14

The same procedure as defined in Example 5 was conducted except that a solution containing 1 mol/liter of $(C_2H_5)_4NBF_4$ in propylene carbonate and ethylene carbonate (mixing volume ratio: 1:1) was used as an electrolyte, thereby obtaining an electric double-layer capacitor. The obtained electric double-layer capacitor exhibited an initial capacitance of 1.55 F.

Comparative Example 12

The same procedure as defined in Example 11 was conducted except that the rest potential of the activated carbon electrodes was controlled to 1.0 V (relative to Li/Li$^+$) by doping lithium into the activated carbon electrodes using the same charge and discharge apparatus as used in Example 11, thereby obtaining an electric double-layer capacitor. When the voltages of 3.4 V and 3.8 V were applied to the obtained electric double-layer capacitor, the potential drop was caused within one hour, so that it was impossible to measure the energy density of the capacitor. After the test, the coin cell-type capacitor was considerably swelled by gases generated due to decomposition of the electrolyte.

Example 15

Into a mixture of 7 g of coconut shells-based activated carbon particles activated with steam (specific surface area: 1,680 $m^2/g$, average particle diameter: 28 $\mu$m, purity: 99.8%), 3 g of coal tar pitch powder, 2 ml of aqueous polyethylene glycol solution (2% by weight) was added dropwisely and mixed in a mortar sufficiently. A part of the obtained mixture was press-molded under a pressure of 400 Kgf/cm$^2$ (by a hydraulic press) to obtain two disc-like molded products having a diameter of 10 mm and a thickness of 0.5 mm, using a tablet machine manufactured by NIHON BUNKO CO., LTD. In a tubular furnace, the thus obtained two disc-like molded products were heated from the room temperature to 850° C. with a heating rate of 3° C./min under nitrogen gas, heated at 850° C. for 2 hours and then, allowed to stand to cool the products to the room temperature, to obtain two activated carbon molded products used for the electric double-layer capacitor according to the present invention. The thus obtained two activated carbon molded products were dried at 300° C. under vacuum pressure of not more than 0.1 torr for 3 hours and put into a grove box under an argon atmosphere. The thus obtained two activated carbon molded products between which a polyethylene separator was interposed, were entirely sandwiched between two platinum plates as current collectors. Further, the sandwiched product was interposed between two 5 mm-thick Teflon plates having four boltholes and bolt-tightened therebetween from outside so as to bring the current collectors, the activated carbon electrodes and the separator into close contact with each other, thereby assembling an open cell-type capacitor. The thus obtained open cell-type capacitor and a lithium electrode prepared by press-attaching a metal lithium foil to a tip end of a platinum plate were immersed in a beaker filled with a propylene carbonate solution containing $LiBF_4$ in an amount of 1 mol/liter. Next, the lithium electrode and the activated carbon electrodes were connected through a lead wire to each other and short-circuited for about one hour. After shortcircuiting, a voltmeter was connected between the activated carbon electrode and the lithium electrode to measure a rest potential of the respective activated carbon electrodes, so that it was determined that the rest potential of two activated carbon electrodes was 2.18 V (relative to Li/Li$^+$). Thereafter, the capacitor was disassembled to remove the two activated carbon electrodes therefrom.

(2) Method of Producing an Electric Double-layer Capacitor

The above-obtained two activated carbon electrodes having a rest potential of 2.18 V were sufficiently impregnated with a solution containing 1.3 mol/liter of $(C_2H_5)_3(CH_3)NBF_4$ in propylene carbonate and ethylene carbonate (mixing volume ratio: 1:1), thereby obtaining positive and negative electrodes. A polyethylene separator was interposed between the thus obtained positive and negative electrodes, thereby obtaining a coin cell-type electric double-layer capacitor as shown in FIG. 1. The internal resistance of the capacitor was 1.90 Ω. Using a charge and discharge apparatus HJ-201B manufactured by HOKUTO DENKO CO., LTD., a voltage of 3.8 V was applied to the thus obtained electric double-layer capacitor at room temperature for one hour, and then the capacitor was discharged at a constant current of 1.16 mA to 1.0 V. As a result, it was determined that the initial electrostatic capacity was 1.29 F and the initial energy density thereof was 5.01 J. In order to evaluate a long-term operation reliability of the capacitor under the voltage-applying condition in an accelerated manner, and a voltage of 3.8 V was applied to the capacitor at the room temperature. As a result, it was determined that a rate of change in energy density of the capacitor after the elapse of 800 hours was −9%.

Example 16

The same procedure as defined in Example 15 was conducted except that coal pitch-based activated carbon particles activated with KOH (specific surface area: 550 m$^2$/g, average particle diameter: 18 μm) was used instead of the coconut shells-based activated carbon particles and the rest potential of the activated carbon electrodes was controlled to 2.11 V, thereby obtaining an electric double-layer capacitor. The internal resistance of the capacitor was 2.1 Ω. After a voltage of 3.8 V was applied to the thus obtained electric double-layer capacitor at room temperature for one hour, and then the capacitor was discharged at a constant current of 1.16 mA to 1.0 V. As a result, it was determined that the initial electrostatic capacity was 1.81 F and the initial energy density thereof was 6.80 J. In order to evaluate a long-term operation reliability of the capacitor under the voltage-applying condition in an accelerated manner, and a voltage of 3.8 V was applied to the capacitor at the room temperature. As a result, it was determined that a rate of change in energy density of the capacitor after the elapse of 800 hours was −10%.

Example 17

The same procedure as defined in Example 1 was conducted except that 1.5 ml of aqueous polyethylene glycol solution (2% by weight) was added to the mixture of 7.5 g of activated carbon powder according to Example 16 and 2.5 g of petroleum pitch (softening temperature: 230° C. and average particle size: 40 μm), and the rest potential of the activated carbon electrodes was controlled to 2.28 mV, thereby obtaining an electric double-layer capacitor. The internal resistance of the capacitor was 2.2 Ω. After a voltage of 3.8 V was applied to the thus obtained electric double-layer capacitor at room temperature for one hour, and then the capacitor was discharged at a constant current of 1.16 mA to 1.0 V. As a result, it was determined that the initial electrostatic capacity was 1.82 F and the initial energy density thereof was 6.76 J. In order to evaluate a long-term operation reliability of the capacitor under the voltage-applying condition in an accelerated manner, and a voltage of 3.8 V was applied to the capacitor at the room temperature. As a result, it was determined that a rate of change in energy density of the capacitor after the elapse of 800 hours was −10%.

Example 18

The same procedure as defined in Example 15 was conducted except that petroleum coke-based activated carbon particles activated with KOH (specific surface area: 1,095 m$^2$/g, average particle diameter: 25 μm) was used as the activated carbon powder and the rest potential of the activated carbon electrodes was controlled to 2.12 V, thereby obtaining an electric double-layer capacitor. The internal resistance of the capacitor was 2.3 Ω. After a voltage of 3.8 V was applied to the thus obtained electric double-layer capacitor at room temperature for one hour, and then the capacitor was discharged at a constant current of 1.16 mA to 1.0 V. As a result, it was determined that the initial electrostatic capacity was 1.58 F and the initial energy density thereof was 5.99 J. In order to evaluate a long-term operation reliability of the capacitor under the voltage-applying condition in an accelerated manner, and a voltage of 3.8 V was applied to the capacitor at the room temperature. As a result, it was determined that a rate of change in energy density of the capacitor after the elapse of 800 hours was −11%.

What is claimed is:

1. An electric double-layer capacitor comprising a non-aqueous solvent electrolyte and polarized electrodes as positive and negative electrodes, which said polarized electrodes have a rest potential satisfying a condition represented by the following formula:

$$(A+B)/2-1.0 \leq E \leq (A+B)/2+0.2$$

wherein E (V) represents a rest potential of said polarized electrodes; A (V) represents a substantial decomposition initiation voltage of said electrolyte on an oxidation or high-potential side; and B (V) represents a substantial decomposition initiation voltage of said electrolyte on a reduction or low-potential side.

2. An electric double-layer capacitor according to claim 1, wherein said rest potential of said polarized electrodes is not less than 1.5 V and less than 2.8 V when Li/Li$^+$ is used as a counter electrode.

3. An electric double-layer capacitor according to claim 1, wherein said polarized electrodes are activated carbon electrodes.

4. An electric double-layer capacitor according to claim 1 wherein a solvent of said electrolyte comprising mainly a mixture of propylene carbonate and ethylene carbonate, and the rest potential of said polarized electrodes in said electrolyte is 1.5 to 2.8 V when $Li/Li^+$ is used as a counter electrode.

* * * * *